United States Patent
Melvin

(10) Patent No.: US 10,631,553 B2
(45) Date of Patent: *Apr. 28, 2020

(54) PROCESS AND COMPOSITION FOR MAKING AN ALCOHOL-CONTAINING FROZEN COMESTIBLE

(71) Applicant: Gelato Fresco, Inc., Toronto (CA)

(72) Inventor: David Hart Melvin, Toronto (CA)

(73) Assignee: GELATO FRESCO, INC., Toronto, Ontario (CA)

( * ) Notice: Subject to any disclaimer, the term of this patent is extended or adjusted under 35 U.S.C. 154(b) by 118 days.

This patent is subject to a terminal disclaimer.

(21) Appl. No.: 15/182,639

(22) Filed: Jun. 15, 2016

(65) Prior Publication Data

US 2016/0353769 A1 Dec. 8, 2016

Related U.S. Application Data

(63) Continuation of application No. 13/826,815, filed on Mar. 14, 2013, now Pat. No. 9,392,808.

(Continued)

(51) Int. Cl.
*A23G 9/32* (2006.01)
*A23G 9/48* (2006.01)
(Continued)

(52) U.S. Cl.
CPC .......... *A23G 9/32* (2013.01); *A23G 9/06* (2013.01); *A23G 9/08* (2013.01); *A23G 9/48* (2013.01)

(58) Field of Classification Search
CPC ... A23G 9/06; A23G 9/32; A23G 9/48; A23G 9/08
See application file for complete search history.

(56) References Cited

U.S. PATENT DOCUMENTS

| | | |
|---|---|---|
| 468,073 A | 2/1892 | Stebbins |
| 3,228,838 A | 1/1966 | Rinfret et al. |

(Continued)

FOREIGN PATENT DOCUMENTS

| | | |
|---|---|---|
| CA | 937450 | 11/1973 |
| CA | 964921 | 3/1975 |

(Continued)

OTHER PUBLICATIONS

Farmer's Nest "Soda Pop Ice Cream," pp. 1-2, Jul. 12, 2010 http://www.thefarmersnest.com/2010/07/soda-pop-ice-cream.html.

(Continued)

*Primary Examiner* — Subbalakshmi Prakash
(74) *Attorney, Agent, or Firm* — Thomas A. O'Rourke; Bodner & O'Rourke, LLP

(57) ABSTRACT

A process for making an alcohol-containing frozen comestible substantially devoid of ice crystal agglomerations and/or ice crystal striations and/or trapped air and/or liquids is provided. The process includes substantially flash freezing an alcohol-containing liquid composition so as to produce a substantially single-phase solid alcohol-containing composition. The solid alcohol-containing composition, and/or pieces thereof, are then exposed to an environment having temperature of from about −15° C. to about −30° C. so as to soften the solid alcohol-containing compositions and/or meld the pieces thereof into a single mass. The temperature of the single mass is then reduced so as to harden the single mass. Also, a process for incorporating a frozen alcohol-containing liquid composition into a non-alcohol-containing fraction is provided. Alcohol-containing liquid compositions suitable for use in the process are also provided.

51 Claims, 4 Drawing Sheets

Related U.S. Application Data

(60) Provisional application No. 61/660,314, filed on Jun. 15, 2012.

(51) Int. Cl.
*A23G 9/06* (2006.01)
*A23G 9/08* (2006.01)

(56) References Cited

U.S. PATENT DOCUMENTS

| | | |
|---|---|---|
| 3,405,531 A | 10/1968 | Davis et al. |
| 3,412,573 A | 11/1968 | Pauliukenis |
| 4,008,580 A | 2/1977 | Heber et al. |
| 4,124,997 A | 11/1978 | Sadjina et al. |
| 4,251,547 A | 2/1981 | Liggett |
| 4,479,363 A | 10/1984 | Gibson et al. |
| 4,517,814 A | 5/1985 | Rothstein |
| 4,569,204 A | 2/1986 | Ott et al. |
| 4,655,047 A | 4/1987 | Temple et al. |
| 4,687,672 A | 8/1987 | Vitkovsky |
| 4,748,817 A | 6/1988 | Oura et al. |
| 4,761,962 A | 8/1988 | Andersson |
| 4,843,840 A | 7/1989 | Gibson |
| 4,848,094 A | 7/1989 | David et al. |
| 4,972,681 A | 11/1990 | Lufkvist |
| 4,982,571 A | 1/1991 | Marschik et al. |
| 4,982,577 A | 1/1991 | Milankov et al. |
| 5,000,012 A | 3/1991 | Lufkvist |
| 5,084,295 A | 1/1992 | Whelan et al. |
| 5,126,156 A | 6/1992 | Jones |
| 5,186,008 A | 2/1993 | Appolcnia et al. |
| 5,186,019 A | 2/1993 | Weyermanns et al. |
| 5,199,269 A | 4/1993 | Andersson |
| 5,203,820 A | 4/1993 | Dibbs |
| 5,223,185 A | 6/1993 | Takei et al. |
| 5,299,426 A | 4/1994 | Lermuzeaux |
| 5,522,227 A | 6/1996 | Appolonia |
| 5,661,981 A | 9/1997 | Laux et al. |
| 5,664,422 A | 9/1997 | Jones |
| 5,694,777 A | 12/1997 | Weyermanns |
| 5,878,582 A | 3/1999 | Appolonia et al. |
| 5,881,561 A | 3/1999 | Viard |
| 5,921,091 A | 7/1999 | Foss et al. |
| 5,979,165 A | 11/1999 | Cox et al. |
| 5,987,898 A | 11/1999 | Olofsson et al. |
| 6,000,229 A | 12/1999 | Jones et al. |
| 6,209,329 B1 | 4/2001 | Jones et al. |
| 6,213,470 B1 | 4/2001 | Kosock et al. |
| 6,216,470 B1 | 4/2001 | Kosock et al. |
| 6,223,542 B1 | 5/2001 | Jones et al. |
| 6,308,522 B1 | 10/2001 | Jones et al. |
| 6,349,549 B1 | 2/2002 | Angus et al. |
| 6,383,257 B1 | 5/2002 | McDermott et al. |
| 6,393,859 B1 | 5/2002 | Olsson et al. |
| 6,401,464 B2 | 6/2002 | Jones et al. |
| 6,481,226 B2 | 11/2002 | Jones et al. |
| 6,494,049 B1 | 12/2002 | Jones et al. |
| 6,510,890 B1 | 1/2003 | Paskach et al. |
| 6,539,743 B2 | 4/2003 | Jones |
| 6,555,154 B2 | 4/2003 | Jones et al. |
| 6,560,973 B2 | 5/2003 | Jones et al. |
| 6,574,969 B1 | 6/2003 | Angus et al. |
| 6,915,896 B2 | 7/2005 | Jones |
| 6,976,369 B2 | 12/2005 | Nothum, Jr. |
| 7,062,924 B2 | 6/2006 | Irvine et al. |
| 7,475,554 B2 | 1/2009 | Irvine et al. |
| 2002/0014081 A1 | 2/2002 | Jones et al. |
| 2002/0017105 A1 | 2/2002 | Jones et al. |
| 2002/0129616 A1 | 9/2002 | Jones |
| 2003/0215548 A1 | 11/2003 | Mihajlovic |
| 2003/0228398 A1 | 12/2003 | Seven et al. |
| 2004/0247747 A1 | 12/2004 | Jones et al. |
| 2005/0064074 A1 | 3/2005 | Whiteside et al. |
| 2005/0106301 A1 | 5/2005 | Jones |
| 2005/0129810 A1 | 6/2005 | Lindner et al. |
| 2006/0013924 A1 | 1/2006 | Jones et al. |
| 2006/0134274 A1 | 6/2006 | Ladd et al. |
| 2010/0062134 A1* | 3/2010 | Melvin .............. A23G 9/06 426/548 |
| 2011/0293813 A1* | 12/2011 | Cavallini ........... A23C 9/1307 426/575 |

FOREIGN PATENT DOCUMENTS

| | | |
|---|---|---|
| CA | 1217351 | 2/1987 |
| EP | 332 287 | 1/1989 |
| EP | 0844018 | 5/1998 |
| FR | 2530323 | 1/1984 |
| FR | 2756196 | 5/1998 |
| GB | 1251526 | 10/1971 |
| GB | 1 264 439 | 2/1972 |
| GB | 2 092 880 | 8/1982 |
| JP | 4091749 | 3/1992 |
| JP | 7008240 | 1/1995 |
| JP | 8261618 | 10/1996 |
| JP | 9310943 | 12/1997 |
| JP | 11151434 | 6/1999 |
| JP | 2002192519 | 7/2002 |
| WO | WO 87/04903 | 8/1987 |
| WO | WO 97/04663 | 2/1997 |
| WO | WO 00/030468 | 6/2000 |
| WO | WO-2000/030468 | 6/2000 |
| WO | WO 00/42862 | 7/2000 |
| WO | WO 0138804 | 5/2001 |
| WO | WO 01/68230 | 9/2001 |
| WO | WO 01/68231 | 9/2001 |

OTHER PUBLICATIONS

Butler "Orage Soda Ice Cream," pp. 1-3, Jul. 12, 2007 http://www.food.com/recipe/orange-soda-ice-cream-electric-ice-cream-maker-240036.

Arbuckle, Ice Cream 2nd Edition, AVI Publishing Company, 1972, pp. 39 and 41.

GMO "Mono and diglycerides," Jul. 5, 2009, pp. 1-2, http://www.gmo-compass.org/eng/database/e-umbers/159. mono_diglycerides.html.

Igoe et al, Dictionary of Food Ingredients 3rd Edition, Chapman and Hall 1996, p. 14.

* cited by examiner

PROCESS AND COMPOSITION FOR MAKING AN ALCOHOL-CONTAINING FROZEN COMESTIBLE

CROSS-REFERENCE TO RELATED APPLICATION

This application is related to and claims benefit of priority to U.S. Provisional Patent Application Ser. No. 61/660,314 entitled "PROCESS AND COMPOSITION FOR MAKING AN ALCOHOL-CONTAINING FROZEN COMESTIBLE," filed Jun. 15, 2012, the disclosure of which is herein fully incorporated by reference.

FIELD

This invention relates to a process and composition for producing alcohol-containing frozen comestibles having a substantially uniform frozen consistency.

BACKGROUND

In the production of frozen comestibles, such as ice cream, a liquid composition including a fat component, a sugar component, a water component, and other flavouring agents are mixed together. The temperature of the composition is then reduced to about −5° C. to −8° C. while the mixing continues. Once temperature of the composition has been reduced, it is placed into vessels for shaping and further freezing until the composition substantially solidifies.

In order to obtain the correct consistency, the amount of freezing required is dependent on the amount of sugar, fat and other ingredients in the composition. The liquid composition therefore is imparted with a "freeze point depression" as a result of the various ingredients affecting the freezing point of the composition. The imparted freeze point depression can be characterized in terms of the sucrose equivalency of the liquid composition. The sucrose equivalency of a given liquid composition may include the contribution of the components of the composition, such as milk solids or glucose components and other ingredients included in the liquid composition. The sucrose equivalency is a measurement known in the industry and is used to compare the freezing capacity of a composition to the freezing rates and temperature of various concentrations of sucrose so as to provide a standard against which to measure the freeze point depression. For example, for a given ingredient in solution, the equivalent concentration of sucrose that would have the same freezing point depression effect can be calculated. Thus, the sucrose equivalency allows the freezing point depression effect caused by a particular ingredient in the composition to be calculated.

In order to calculate the sucrose equivalency, and the thus the freezing point depression effect of a given ingredient, the molecular weight of the components of an ingredient which can dissociate in water are determined. Thus, the molecular weight of each dissociated component as it exists in water is determined. The percentage of dissociated component relative the total molecular mass of the ingredient, including the stoichiometric ratio of water required for dissociation is determined. Separately, the molecular weight of sucrose is then divided by the molecular mass of the dissociated component and multiplied by 100 to arrive at the sucrose equivalent for each dissociated component. To calculate the freezing point depression resultant from the ingredient, the percentage of dissociated component relative the total molecular mass of the ingredient is divided by 100 and multiplied by the sucrose equivalent for each component and the sucrose equivalents are summed. Therefore, according to the calculations, for every 100 g of the given ingredient in a given volume of water, the freezing point of the water including the ingredient, would be depressed by the amount in grams of sucrose in water equal to the summed sucrose equivalent value. For example, the sucrose equivalency, where sucrose is taken to be "1", non-fat milk solids have a sucrose equivalency of 0.545, and high fructose corn syrup has a sucrose equivalency of 1.8.

Therefore, when producing many frozen comestibles, such a calculation can be used to determine the sucrose equivalency of the ingredients and thus, the freezing point depression such that a substantially uniform frozen comestible results. For example, the ratios of the various ingredients can be adjusted such that the amount of each ingredient results in a substantially consistent freezing point for all the ingredients. However, if an ingredient is added to the liquid composition that has a much higher sucrose equivalency or significantly lower freezing point than the other ingredients, adjustment of the ingredient ratios may not be possible to obtain the desired frozen comestible and the resultant frozen comestible does have a substantially uniform, or smooth, consistency since the water component freezes well before the other ingredients.

Furthermore, some, ingredients, such as alcohol have a non-linear sucrose equivalency with increasing concentrations in a given fluid medium. Alcohol (ethanol), for example has a geometrically progressive effect on freezing point depression, wherein, for example, a 2.5% concentration equates to a sucrose equivalency of 17, and a 17.5% concentration equates to a sucrose equivalency of 126. The result of freezing liquid compositions also containing alcohol, under conditions known in the art to produce frozen comestibles, is undesirable as ice crystal agglomerations or ice crystal striations or "pockets" of ice crystals are formed in the frozen comestible. Also, with some desirable ingredients, the ratios cannot be adjusted so as to obtain the desired uniform consistency of the frozen comestible while maintaining the desired flavor and other properties of the frozen comestible. As noted above, such pockets of ice crystals are found when freezing liquid compositions that include an alcohol component using known techniques for making a frozen comestible. Therefore, it would desirable to develop a process for freezing compositions that include an alcohol component in which the resulting frozen composition is substantially devoid of ice crystal striations or pockets and has an ice cream-like consistency at a serving temperature. Furthermore, it would be desirable to provide a process for producing a stable frozen alcohol-containing comestible which can be stored and served at product temperatures normally associated with conventional ice creams.

SUMMARY OF THE GENERAL INVENTIVE CONCEPT

The following presents a simplified summary of the general inventive concept herein to provide a basic understanding of some aspects of the invention. This summary is not an extensive overview of the invention. It is not intended to restrict key or critical elements of the invention or to delineate the scope of the invention beyond that which is explicitly or implicitly described by the following description and claims.

In one aspect, there is provided a process for producing an alcohol-containing frozen comestible having a substantially uniform frozen consistency from a multi-component, alcohol-containing liquid composition. The process comprises:
a) freezing the alcohol-containing liquid composition at a rate to effect substantially simultaneous freezing of the components to produce a single-phase solid alcohol-containing composition;
b) raising the temperature of the single-phase solid alcohol-containing composition to a temperature in the range of from about −30° C. to about −15° C. so as to soften the substantially single-phase solid alcohol-containing composition to form at least one single mass; and
c) cooling the at least one single mass to a temperature of below about −35° C. to form the alcohol-containing frozen comestible.

In some embodiments, the temperature environment, or freezing, to solidify and attain the substantially single-phase solid alcohol-containing composition of step a) is provided below at least about −28° C. In further embodiments, the temperature of the environment to freeze and thus solidify and attain the substantially single-phase solid alcohol-containing composition of step a) is provided at a temperature of at least −30° C., −40° C., −50° C., −60° C., −78.5° C. or −196° C. so as to ensure rapid freezing of the alcohol-containing liquid fraction to attain the desired consistency of the substantially single-phase solid alcohol-containing fraction.

In some embodiments, freezing the alcohol-containing liquid composition of step a) includes contacting the alcohol-containing liquid composition with a suitably cold contact medium, such as dry ice or liquid nitrogen, so as to solidify and attain the substantially single-phase solid alcohol-containing composition. In some embodiments, step a) includes adding the alcohol-containing liquid composition to a freezing temperature environment so as to solidify and attain the substantially single-phase solid alcohol-containing fraction in a shower-type or drop-wise fashion.

In some embodiments, the freezing to solidify and attain the substantially single-phase solid alcohol-containing composition in step a) is provided by solid $CO_2$ or liquid nitrogen where the alcohol-containing liquid composition is contained in a first vessel and the solid $CO_2$ or liquid nitrogen is co-placed in a second vessel with the first vessel and the alcohol-containing liquid composition allowed to solidify in the first vessel. Furthermore, the size and shape of the first vessel may be selected to allow the required rate of freezing of a given volume of the alcohol-containing liquid composition.

In some embodiments, step a) of the process further includes fracturing the solid alcohol-containing composition so as to obtain a plurality of solid alcohol-containing composition pieces, the plurality of solid alcohol-containing pieces having a size in the range of from about a dust-like sized particle to about 15 cm in cross-sections lengths. Furthermore, in preferred embodiments, step a) of the process further includes fracturing the solid alcohol-containing composition so as to obtain the plurality of solid alcohol-containing composition pieces having a size of about 50 mm in cross-sectional lengths.

In some embodiments, the temperature in step b) is about −25° C. and in still further embodiments, the solid alcohol-containing composition, and pieces thereof, if present, are subjected to the temperature environment of step b) for a time period of up to about 12 hours so as to soften the substantially single-phase solid alcohol-containing composition and meld the pieces together so as to form the single mass.

In some embodiments, the temperature in step c) is about −60° C. In still further embodiments, the temperature in step c) is about −78.5° C.

In another aspect, the process further includes step d) of encapsulating the single mass in an ice cream.

In some embodiments, step b) also includes introducing the solid alcohol-containing composition, when the temperature thereof is below about −28° C., to a frozen non-alcohol-containing composition having a temperature from about −8° C. to about −15° C. so as to yield the at least one single mass from the solid alcohol-containing composition and subsequently resulting in an alcohol-containing composition and non-alcohol-containing composition mixture; and in step c) cooling the alcohol-containing composition and non-alcohol-containing composition mixture to a temperature of below about −15° C. so as to harden and produce the alcohol-containing frozen comestible. Furthermore, in some embodiments, the process includes fracturing the solid alcohol-containing composition prior to introduction to the frozen non-alcohol-containing composition. The fracturing thus provides a plurality of solid alcohol-containing composition pieces formable into the at least one single mass. In some embodiments the plurality of solid alcohol-containing composition pieces have a size in the range of from about a dust-like sized particle to about 15 cm in cross-sections lengths.

In some embodiments, the process includes mixing the solid alcohol-containing composition and non-alcohol-containing composition so as to produce striations and/or pockets of the alcohol-containing composition intermixed in the non-alcohol-containing composition.

In some embodiments, the temperature in step c) is about −20° C. In still further embodiments, the temperature in step c) is about −25° C.

In some embodiments, the alcohol-containing liquid composition and thus the alcohol-containing portion of the frozen comestible produced according the processes disclosed herein includes from about 16% to about 24% of a sugar component, from about 12% to about 20% of a fat component and from about 15% to about 22% of an alcohol component. In some embodiments, the alcohol-containing liquid composition includes about 20% of a sugar component, about 16% of a fat component and from about 16% to about 19% of an alcohol component. The alcohol component is provided as ethanol. In some embodiments, the alcohol-containing frozen comestible has an alcohol content of from about 1% to about 15%. In some embodiments, the alcohol-containing frozen comestible has an alcohol content of about 5%.

In another aspect, there is provided an alcohol-containing frozen comestible having at least a portion thereof of a frozen alcohol-containing composition having a substantially uniform consistency, or wherein an alcohol-containing fraction of a frozen comestible has substantially uniform consistency, the frozen alcohol-containing composition comprising from about 16% to about 24% of a sugar component, from about 12% to about 20% of a fat component and from about 15% to about 22% of an alcohol component. In some embodiments, the frozen alcohol-containing composition of the alcohol-containing frozen comestible has an alcoholic component from about 17% to 19%.

BRIEF DESCRIPTION OF THE DRAWINGS

In order that the invention may be better understood, exemplary embodiments will now be described by way of example only, with references to the accompanying drawings, wherein.

DESCRIPTION OF THE EXEMPLARY EMBODIMENTS

Figure 1:
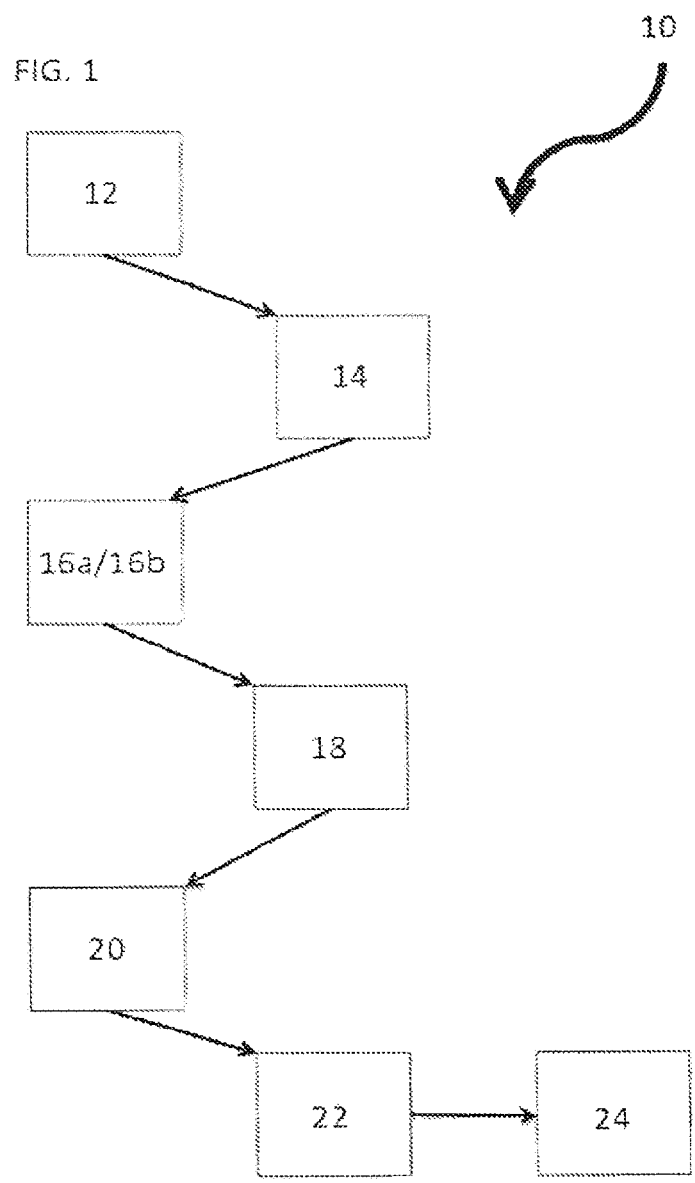
FIG. 1 is a schematic flow diagram of an embodiment of the process.

It should be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein are meant to encompass the items listed thereafter and equivalents thereof as well as additional items. However, other alternative physical or other configurations are possible which are considered to be within the teachings of the instant disclosure.

Figure 2:
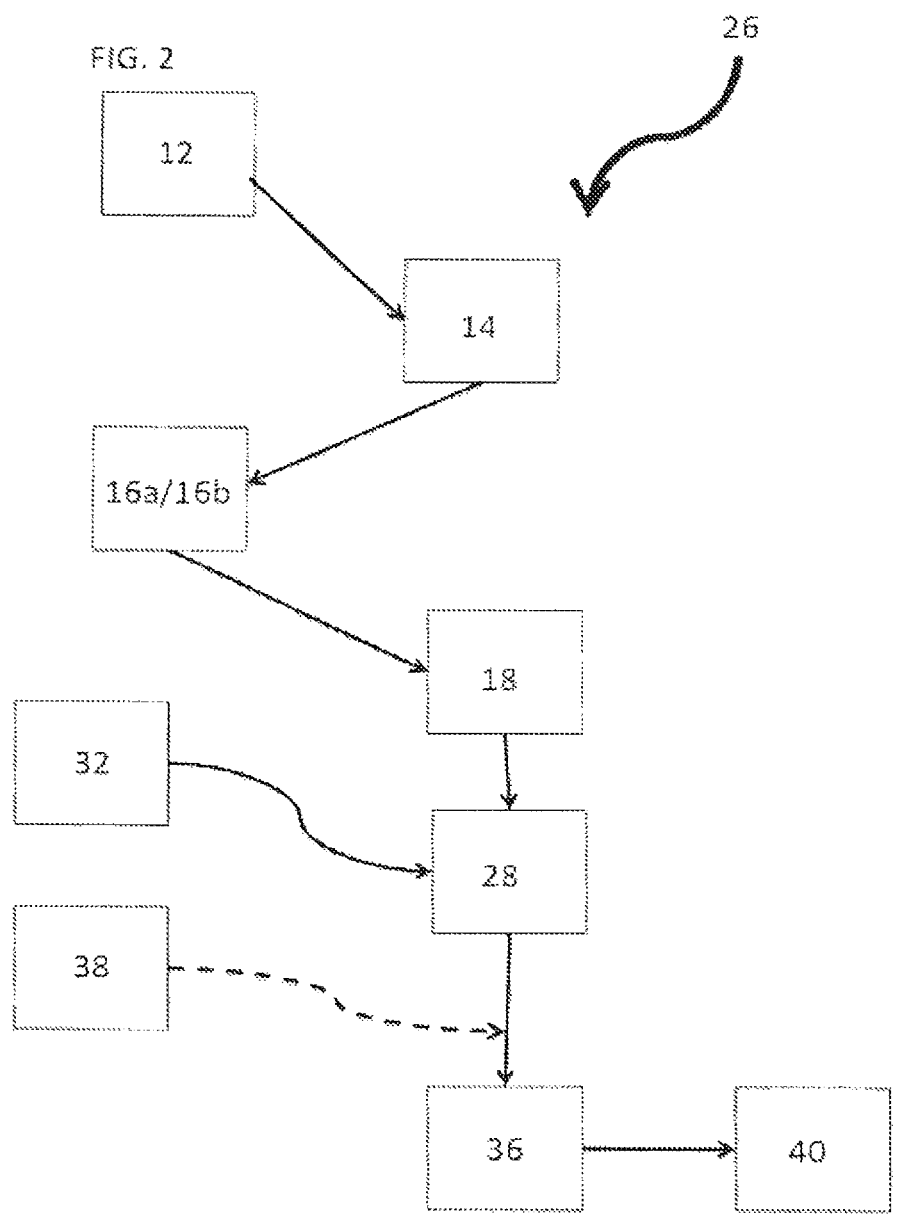
FIG. 2 is a schematic flow diagram of an embodiment of the process.

With reference to FIGS. 1 and 2, schematic processes of exemplary embodiments are provided generally at 10 and 26, respectively. An alcohol-containing liquid composition 12 is introduced to an initial temperature environment 14 suitable to produce a substantially single-phase solid alcohol-containing fraction 16a. The terminology of "single-phase" with respect to the freezing of the alcohol-containing liquid composition 12, as used in the instant disclosure, means a temperature below which all components of the alcohol-containing liquid composition 12 freeze substantially simultaneously so as to produce the solid alcohol-containing fraction 16a. Conversely, in conventional ice cream production processes, as the temperature in such processes is decreased, the water content first freezes, followed by, at a further time point, the fat component thereby leading to the inclusion of trapped air portions and unfrozen liquid sugar/water mixture (which remains as a liquid at –8° C., the temperature of the initial freezing in conventional ice cream production processes). The initial freezing environment as shown at 14, in some exemplary embodiments of the instant disclosure, may be below a temperature of about –28° C. However, depending on the rate at which it is desired that the alcohol-containing liquid composition 12 is desired to be frozen, the initial freezing environment 14 may be at least –30° C., –40° C., –50° C., –60° C., –78.5° C. (the temperature of solid $CO_2$ (dry ice)), –196° C. (the temperature of liquid $N_2$ (liquid nitrogen)). The temperature of the initial freezing environment 14 is chosen so as to ensure rapid freezing of the solid alcohol-containing composition 12 to attain the desired consistency of the solid alcohol-containing composition 16a or pieces 16b thereof. Therefore, there are several factors that may be considered when choosing the temperature of the initial freezing environment 14, such as, for example, the size and shape of a first vessel 42 used to contain the alcohol-containing liquid composition 12 in some exemplary embodiments, whether the alcohol-containing liquid composition 12 is poured or sprinkled to come into contact with dry ice or liquid nitrogen, whether an air blast freezer is used to solidify the alcohol-containing liquid composition 12 to the solid alcohol-containing composition 16a or pieces 16b thereof and the percentage alcohol content of the liquid composition. The temperature of the initial freezing environment 14 is thus chosen to ensure rapid freezing of the alcohol-containing liquid composition 12 to the single-phase solid alcohol-containing composition 16a or pieces 16b thereof. For example, in some exemplary embodiments, the alcohol-containing liquid composition 12 may be contacted with a contact medium, such as, for example dry ice or liquid nitrogen, such that the temperature of the initial freezing environment 14 may be near about –85° C. or –196° C., the temperature of dry ice or the boiling point of liquid nitrogen, respectively. Resultant from the contact is the rapidly frozen solid alcohol-containing composition 16a, which in some instances may also include pieces 16b thereof.

Hereinafter the initial freezing environment 14 may thus encompass temperatures as noted above, for example, generally those below –28° C. The alcohol-containing liquid composition 12, in the initial freezing environment 14 undergoes a rapid or substantially flash-freeze and results in the solid alcohol-containing composition 16a, as noted above. Such an initial freezing environment may be created, for example, through use of liquid nitrogen or dry ice and subjecting the alcohol-containing liquid composition 12 to a liquid nitrogen bath or dry ice. The initial freezing environment 14, in some embodiments may also be created by a freezer capable of reaching temperatures below about –28° C. or by way of co-placing the alcohol-containing liquid composition 12 in a first vessel 42 and co-placing the first vessel in a second larger vessel 44 with dry ice or liquid nitrogen, as discussed below.

Figure 3:
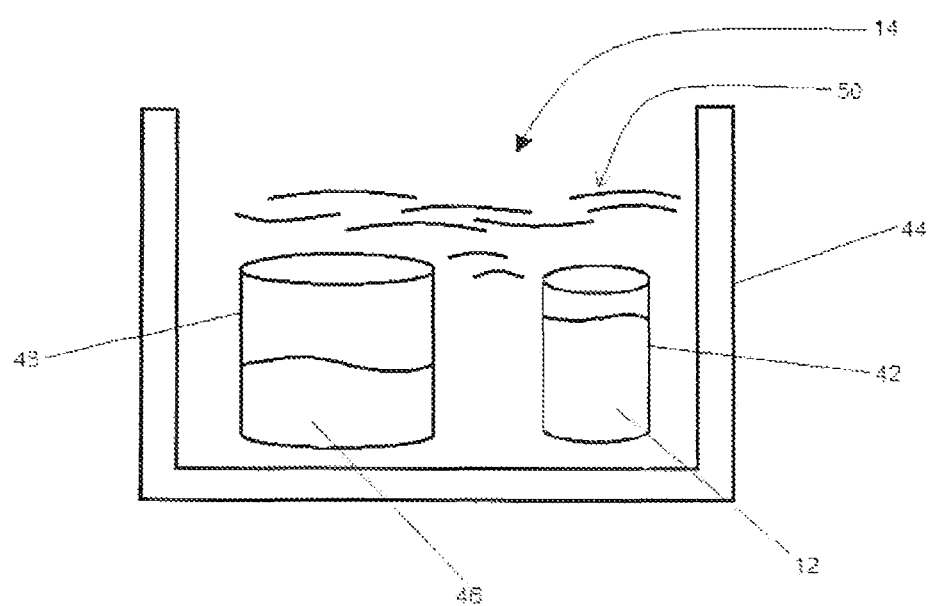
FIG. 3 is cut-away schematic diagram of an exemplary initial freezing environment where the alcohol-containing liquid composition is frozen by cold gases.

Turning now to FIG. 3, an exemplary embodiment for freezing the alcohol-containing liquid composition 12 to attain the substantially single-phase solid alcohol-containing composition or fraction 16a is discussed. A first vessel 42 of suitable size and shape is selected so as ensure rapid freezing of the alcohol-containing liquid composition 12 such that, when frozen, the substantially single-phase solid alcohol-containing composition or fraction 16a is attained having the desired consistency and being substantially devoid ice crystals or agglomerates thereof which lead to a non-single phase solid composition. The first vessel 42 is co-placed in second vessel 44 which is larger than the first vessel 42 such that the first vessel 42 can be placed therein, along with dry ice or liquid nitrogen 46 to provide the required level of cooling. The second vessel 44, in some embodiments (not shown), may have a lid or cover so as to provide an enclosed second vessel. However, if the sides of the second vessel 44 are higher than that of the first vessel 42, cold gases shown schematically at 50, from, the dry ice or liquid nitrogen remain low in the second vessel 44 and thus cool the alcohol-containing liquid composition 12 in the second vessel 44. Therefore, in order to provide the initial cooling environment 14, a lid or cover to the second, vessel may not be required. Furthermore, in preferred embodiments, the dry ice or liquid nitrogen is not placed in direct contact with the first vessel 42 and is thus physically separated from the first vessel by some means, for example an open upper end container 48, as shown in FIG. 3, or another form of a barrier. Using dry ice or liquid nitrogen to provide the cooling in the second vessel may provide a temperature environment 14 of about –28° C. and in preferred embodiments below about –60° C. However, depending on the required rate of freezing of the alcohol-containing liquid composition 12, the initial temperature environments 14 may be provided below at least about −28° C. and in some embodiments below about −30° C., −40° C., −50° C. Other considerations regarding the initial freezing temperature may be the size and shape of the first vessel, the alcohol content of the liquid composition as well as quantity of the alcohol-containing liquid composition desired to the frozen solid.

Figure 4:
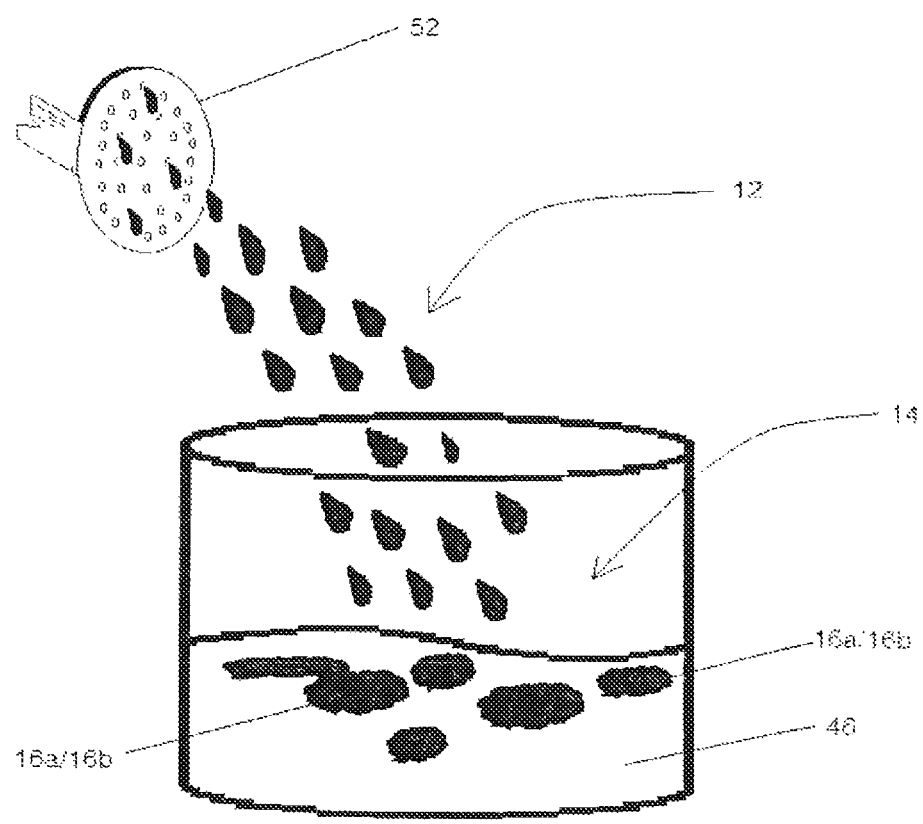
FIG. 4 is a schematic diagram of an exemplary initial freezing environment where the alcohol-containing liquid composition is frozen by contact with a nongaseous cold contact medium.

With respect to the solid alcohol-containing composition or fraction 16a, one or more pieces of solid alcohol-containing composition pieces 16b may result from the introduction of the alcohol-containing liquid composition 12 to the initial freezing environment 14. As schematically shown in FIG. 4, for example, in some embodiments, the alcohol-containing liquid composition 12 may be poured into a contact medium, such as a liquid nitrogen bath or over dry ice (a cold contact medium 46), from a shower head or similar means as shown schematically at 52. In other exemplary embodiments, the alcohol-containing liquid composition 12 may be similarly showered or sprinkled, as a stream or as droplets, into the liquid nitrogen bath or over dry ice 46 from suitable means 52. In other exemplary embodiments, the alcohol-containing liquid composition 12 may be added dropwise to liquid nitrogen bath or over dry ice 46. Therefore, when the alcohol-containing liquid composition 12 contacts the liquid nitrogen 46 or the dry ice 46, the initial freezing or temperature environment 14 is provided at near about −196° C. or −78.5° C., respectively so as attain the substantially single-phase solid alcohol-containing composition 16a and or pieces 16b thereof. The alcohol-containing liquid composition 12 may also be poured, showered or sprinkled through, for example a refrigerated air chamber environment cooled to below about −30° C. or cooler such that solid alcohol-containing composition pieces 16b result. Other suitable nongaseous cold contact mediums 46 beyond that of the exemplary embodiments noted above of dry ice or liquid nitrogen will be apparent to those of skill in the art to realize the solid alcohol-containing composition or fraction from reading the instant description.

The solid alcohol-containing composition 16a or the solid alcohol-containing composition pieces 16b, may, in some instances, be further subjected to fracturing at 18 as shown in FIGS. 1 and 2 so as to provide the plurality of solid alcohol-containing composition pieces 16b within a predetermined size range. The predetermined solid alcohol-containing composition pieces 16b size range may, for example, be from a dust-like sized particle having a size of less than about 1 mm in cross-sectional lengths to about 15 cm in cross-sectional lengths. In some embodiments, other sizes of predetermined solid alcohol-containing composition pieces 16b outside of the abovementioned range may also be made and suitable.

Now, with respect to the exemplary process as schematically shown in FIG. 1 specifically, once the plurality of solid alcohol-containing composition pieces 16b are obtained, they are assembled into a suitably sized softening and/or melding vessel at 20. The solid alcohol-containing composition pieces 16b assembled into the suitably sized softening and/or melding vessel are then warmed from the temperature resulting from the initial freezing environment 14 to a temperature of from about −15° C. to about −30° C. at 20, where the solid alcohol-containing composition pieces 16b meld together and form a single mass 22 which is substantially free from ice crystal agglomerates and/or ice crystal striations or the like embedded in the single mass 22 as well as trapped air and liquid portions. In some embodiments where solid alcohol-containing composition pieces 16b are not present and as such a solid alcohol-containing composition as a single mass is obtained, the solid alcohol-containing composition 16a is held in the softening and/or melding vessel at a temperature of about −15° C. to about −30° C. at 20, preferably of about −28° C. Regardless of whether a solid alcohol-containing composition 16a and/or pieces 16a thereof are obtained, the single mass 22 is softened at the abovementioned temperature range so as to attain the desired "creaminess" or smoothness consistent with that of ice-cream. Furthermore, in the formation of the single mass 22, the temperature may be held substantially constant at about −25° C. to about −28° C., as shown at 20, until the solid alcohol-containing composition pieces 16b have melded together and have formed into the desired single mass 22 with the desired level of "creaminess" or such that the single mass 22 is softened to the desired level of creaminess or smoothness. The desired level of "creaminess" can be determined by the size of any ice crystals, preferably as small as possible, and the amount of total solids and creaminess thus a function of the combination of the two. Moreover, in some exemplary embodiments, the time for which the solid alcohol-containing composition 16a and/or pieces 16b thereof are subjected to the temperatures noted above in the softening and/or melding vessel is about 12 hours. Subjecting the solid alcohol-containing composition pieces 16b to the temperatures and time period noted provides for a gradual warming of the solid alcohol-containing composition pieces 16b such that they can meld into the single mass 22, or in some embodiments, soften the solid alcohol-containing composition 16a to the single mass 22 to the desired level of "creaminess" without damage and to maintain the integrity of the single-phase, discussed below.

Although size of the softening and/or melding vessel at 20 may be variable, in some exemplary embodiments, the suitably sized vessels have a volume of from about 10 ml to about 1000 ml. In other exemplary embodiments the volume of the suitably sized vessels is from about 250 ml to about 750 ml. And in further exemplary embodiments, the suitably sized vessel has a volume of about 500 ml. Additionally, although the shape of the vessel may be chosen from a variety of available container shapes available, in some exemplary embodiments, the container shape is generally cylindrical.

Continuing with reference to FIG. 1, once the single mass 22 has been desirably formed, it is subjected to an environment, the final freezing environment 24, so as to harden the single mass 22. The single mass 22 can then be stored, packaged, served, consumed, or used as a component in the further production of a frozen comestible. In some exemplary embodiments, the final freezing environment has a temperature below about −35° C. In some embodiments, the final freezing temperature may be from below about −35° C. to about −115° C. In some exemplary embodiments, the temperature is held substantially constant at about −60° C. Such a final freezing environment, for example, may be created by subjecting the single mass 22 to a dry ice (solid $CO_2$) or liquid nitrogen temperature-control led environment or other means of temperature-controlled environment, such as a freezer capable attaining such temperatures. Although not required, the single mass frozen comestible is desirably warmed to serve at temperature of from about −22° C. to −30° C.

By initially flash freezing the alcohol-containing liquid composition 12, the resultant solid alcohol-containing composition 16a is substantially devoid of ice crystal agglomerates, trapped air and liquids. Increasing the temperature then causes the solid alcohol-containing composition 16a to soften to a degree where it forms into the single mass 22 having a desired consistency of creaminess. However with the temperature being less than the melting point of water and ethanol (for the concentrations provided herein), the sucrose equivalency of the initial alcohol-containing liquid composition 12, as a result of other ingredients present, allows the solid alcohol-containing composition pieces 16b to meld together to the single mass 22 without the alcohol or water components melting to a point where ice crystals can form. In other words, the water component of the processes disclosed herein may not thaw independently and form liquid droplets, which on refreezing form ice crystals and ice crystal agglomerates, thus rendering a non-uniform inconsistency to the frozen alcohol-containing composition as is noted in conventional techniques. Therefore, as the solid alcohol-containing composition 16a and pieces 16b thereof are warmed from the initial freezing environment 14 to the from about −15° C. to about −30° C. environment, as noted above, the single-phase is preserved and maintained as the solid alcohol-containing composition 16a and pieces 16b are merged to form the single mass 22.

Unlike the instant process, in the production of conventional non-alcoholic ice cream, the composition used make the ice cream is frozen in an ice cream machine to a soft ice cream consistency and then allowed to harden in a freezing environment. Therefore in conventional ice cream production processes, the starting liquid composition of sugars, fats, water, etc., is not rapidly frozen solid, then warmed and hardened as in the instantly described processes. Furthermore, in conventional ice production processes, the water component freezes first and then the other components freeze in order of increasing sucrose equivalency.

With respect to the final freezing at 24, the frozen comestible may be further utilized in a frozen treat, for example, as a centre for an ice cream ball treat. In such an example, the single mass 22 is scooped or otherwise partitioned and encased in a covering of regular ice cream or in some embodiments, a frozen dairy product, a frozen yogurt or a sorbet or other enrobing composition suitable for encasing the frozen comestible. By encasing the frozen comestible in ice cream, since the frozen comestible has a higher melting point than regular ice cream owning to the inclusion of the alcohol component, a substantially leak-proof delivery system is created, which can be consumed. Furthermore, the encasement of the frozen comestible by the ice cream may also serve to insulate the frozen comestible and thus slow the thawing process. In some exemplary embodiments, the frozen comestible encased in ice cream may further be coated in a suitable comestible dusting comprising a granulated material so as to provide a desired appearance and handling characteristics.

With reference to FIG. 2 specifically, in another exemplary embodiment, once the solid alcohol-containing fraction 16a and fraction pieces 16b are subjected to fracturing at 18, if required, so as to obtain a size range of substantially from about a dust-like sized particle of less than 1 mm in cross-sectional lengths to about 15 cm in cross-sectional lengths, as noted above, the plurality solid alcohol-containing fraction pieces 16b are added, at 28, to a frozen non-alcohol-containing fraction 32. Other sizes of solid alcohol-containing fraction pieces 16b outside of above noted range may also be used in some embodiments. In some exemplary embodiments, the plurality solid alcohol-containing fraction pieces 16b are provided with cross-sectional lengths of about 50 mm. The plurality of solid alcohol-containing fraction pieces 16b are introduced to the frozen non-alcohol-containing fraction 32 when the temperatures of each are respectively below about −28° C. and from about −8° C. to about −15° C. In some exemplary embodiments, when the solid alcohol-containing fraction pieces 16b are added at 28, the temperature thereof is about −30° C., −40° C., −50° C., −60° C., −78.5° C. (the temperature of solid $CO_2$ (dry ice)), −196° C. (the temperature of liquid $N_2$ (liquid nitrogen)), depending on whether the substantially single-phase solid alcohol-containing fraction has been re-hardened, in some embodiments, following the soften and/or melding step at 20, for example, in the exemplary process noted above. In such a step, the temperature of the solid alcohol-containing fraction 16a and/or pieces 16b thereof is below that of the temperature of the frozen non-alcohol-containing fraction 32. For example, the temperature of the frozen non-alcohol-containing fraction 32 is from about −8° C. to about −15° C., and in preferred embodiments, nearer −8° C. Furthermore, the non-alcohol-containing fraction 32 may be, for example, an ice cream, a frozen dairy product, a frozen yogurt or a sorbet or other suitable enrobing composition, as noted above, such as a chocolate. However, other non-alcohol-containing frozen compositions may be suitable. The alcohol-containing fraction pieces 16b and the non-alcohol-containing fraction 32, introduced to one another, thus become what is termed herein as an alcohol-containing fraction and non-alcohol-containing fraction mixture 36. Additionally, as shown by the dashed line at 38, the alcohol-containing fraction pieces 16b and the non-alcohol-containing fraction 32 may be optionally mixed by a suitable means of mixing in order that the resultant alcohol-containing frozen comestible includes "veins" and/or striations and/or pockets and/or other inclusions of the frozen alcohol having a substantially uniform consistency desirably intermixed or interlaced therein.

The non-alcohol-containing fraction 32 then becomes an insulating medium for the alcohol-containing fraction 16a/16b. At 40, as shown in FIG. 2, the alcohol-containing fraction and non-alcohol-containing fraction mixture 36 is portioned as desired and packaged in a vessel, for example, as those described above, and placed in an environment having a temperature of below about −15° C. so as to harden to an alcohol-containing frozen comestible as shown schematically at 40 in FIG. 2. In some embodiments, the environment for hardening the alcohol-containing fraction and non-alcohol-containing fraction mixture 36 is maintained at about −20° C., whereas in other exemplary embodiments the temperature of the environment is maintained at about −25° C.

With regard to the embodiment shown schematically in FIG. 2, and also with regard to the discussion above with reference to the production of the solid alcohol-containing composition 16a being of a single-phase substantially devoid of ice crystal agglomerations and/or ice crystal striations, trapped air and/or liquids, it is believed, without wishing to be bound by theory, that the alcohol-containing fraction 16b upon contacting the relatively warmer non-alcohol-containing fraction 32 causes the warming of the alcohol-containing fraction pieces 16b and the melding thereof to form the striations or veins of the alcohol-containing fraction pieces 16b, as discussed above. Also, although the heat transfer noted above occurs, the non-alcohol containing fraction 32 rapidly freezes on contact around the alcohol-containing pieces 16b so as to form a sheath of the non-alcohol-containing fraction around the alcohol-containing pieces so as produce the veins. Thus, the non-alcohol-containing fraction 32 then freezes around the alcohol-containing fraction pieces 16b resulting in the alcohol-containing fraction and non-alcohol-containing fraction mixture 36. The non-alcohol-containing fraction 32 thus encapsulates the alcohol-containing fraction pieces 16b after a degree of melding has taken place, thus producing a vein and/or pocket and/or striation and/or other shaped inclusion of the alcohol-containing fraction.

Additionally, with particular regard to the embodiment referencing FIG. 2, the concentration of alcohol in the alcohol-containing fraction and non-alcohol-containing fraction mixture 36 can thus be varied, as desired, by varying the amount of the alcohol-containing fraction pieces 16b added to the non-alcohol-containing fraction 32. For example, in some exemplary embodiments, the amount of alcohol-containing fraction pieces 16b may be varied such that the concentration of alcohol in the resultant alcohol-containing fraction and non-alcohol-containing fraction mixture 36 is from about 1% to about 15%. In some exemplary embodiments, the concentration of alcohol in the alcohol-containing fraction and non-alcohol-containing fraction mixture 36 may be about 5%. Therefore, an end user may measure standard alcohol servings, particularly when the frozen comestible is packaged to provide a desired number of servings. For example, the frozen comestible may be packaged such that the alcohol content is approximately equal to a standard alcohol serving, for example the equivalent of a 45 ml serving of spirits.

In addition to the above-discussed process embodiments, there is provided an initial alcohol-containing liquid composition 12 suitable for use in conjunction with the process disclosed herein. As noted herein, the various ingredients in a liquid composition will affect the sucrose equivalency of the liquid composition and thus the ingredients contained therein will alter the freezing point depression of a given liquid. In some exemplary embodiments, the initial alcohol-containing liquid composition 12 may have a sugar component of from 16% to about 24%, a fat component of from about 12% to about 20% and an alcohol component of from about 15% to about 22%, wherein the remainder of the initial alcohol-containing liquid composition 12 is substantially comprised of water and optionally, additional flavoring and/or preservation agents, which are know to those of skill in the art. For example, the initial alcohol-containing liquid composition 12 may include about 20% of a sugar component, about 16% of a fat component and from about 16% to about 19% of an alcohol component wherein the remainder of the composition is comprised of water and optionally flavoring and/or preservation agents.

Example 1

For exemplary purposes, a Bailey's Irish Cream™ based liquid alcohol composition, having a sugar component of about 20%, a fat component of about 16% and an alcohol component of about 17% was used in embodiments described herein. The Bailey's Irish Cream™ liquid composition was introduced to a liquid nitrogen bath and flash frozen to a solid Bailey's Irish Cream™ composition so as to produce frozen, solid Bailey's Irish Cream™ pieces. The solid Bailey's Irish Cream™ pieces were then packaged in 500 ml cylindrical vessels and subjected to an environment having a temperature of about −25° C. for a time period of about 12 hours until the solid Bailey's Irish Cream™ pieces had substantially melded into a single mass of the frozen Bailey's Irish Cream™ composition. The frozen Bailey's Irish Cream™ composition, being melded into a single mass, was then subjected to an environment having a temperature of about −35° C. for hardening and stored at a temperature of about −35° C.

Example 2

Additionally, fox exemplary purposes, a Grand Marnier™ based liquid alcohol composition, having a sugar component of about 20%, a fat component of about 16% and an alcohol component of about 18.7% was used in embodiments described herein. The Grand Marnier™ liquid composition was introduced to a liquid nitrogen bath and flash frozen to a solid Grand Marnier™ composition so as to produce frozen, solid Grand Marnier™, pieces. The solid Grand Marnier™ pieces wherein packaged in 500 ml cylindrical vessels and subjected to an environment having a temperature of about −25° C. for a time period of about 12 hours until the solid Grand Marnier™ pieces had substantially melded into a single mass of frozen Grand Marnier™. The frozen Grand Marnier™ composition, being melded into a single mass, was then subjected to an environment having a temperature of about −35° C. for hardening and stored at a temperature of about −35° C.

Example 3

In another example, 500 ml of Bailey's Irish Cream™ was placed into a 1 L vessel (first vessel) and placed in an enclosed space (second vessel) with liquid nitrogen. The liquid nitrogen was not in direct contact with first vessel. As the liquid nitrogen converted to a gas, the cold nitrogen gas or vapours cooled the enclosed space, to a temperature of about −60° C. as measured by an infrared thermometer. The temperature of the Bailey's Irish Cream™ was allowed to equilibrate to the −60° C. temperature of the enclosed space and thus rapidly freeze to a solid alcohol-containing composition. Once frozen, the solid alcohol-containing Bailey's Irish Cream™ composition was stored overnight at about −30° C. to a softened single mass relative the solid alcohol-containing Bailey's Irish Cream™ composition as described above. The resultant product showed similar consistency characteristics to that of the embodiment of Example 1, that being substantially devoid of ice crystals and ice crystal agglomerates, however the consistency was not as creamy as the product of Example 1.

Example 4

Testing was conducted similar to that described above with respect to Example 3, however the temperature of the enclosed space and thus the solid alcohol-containing Bailey's Irish Cream™ composition varied in each test to be about −28° C., −30° C., −40° C. and −50° C. in the various tests. In each case, the resultant solid alcohol-containing Bailey's Irish Cream™ composition was stored at −28° C. overnight to form a softened single mass relative the solid alcohol-containing Bailey's Irish Cream™ composition. In all tests the product obtained following the softening step possessed the desired characteristics of being substantially de void of ice crystals and ice crystal agglomerates and having creamy consistency similar to that of non-alcohol-containing ice cream. However, it was noted that the higher the temperature of the initial freezing environment (the enclosed space), the less creamy the final texture of the single mass. Therefore the faster the rate at which the alcohol-containing liquid Bailey's Irish Cream™ composition is frozen to the solid alcohol-containing Bailey's Irish Cream™ composition, the creamier the final texture of the product.

For example, in the testing, the rate of freezing and cooling of 100 ml of the alcohol-containing liquid Bailey's Irish Cream™ composition from +2° C. to about −50° C. to form the solid Bailey's Irish Cream™ composition was about 30 minutes. At this freezing rate the desired substantially single-phase solid alcohol-containing Bailey's Irish Cream™ composition and thus creamy final product was attained. As noted above, under conventional ice cream making freezing techniques and processes, the final product is not a substantially single-phase creamy-type product and includes ice crystals and/or ice crystal agglomerates. Under conventional ice cream making techniques where the freezing takes places at about from −5° C. to about −8° C., freezing of 100 ml of the alcohol-containing liquid Bailey's Irish Cream™ composition takes several hours and the composition is not frozen to a solid, but rather cooled to a "soft serve" or still flowable consistency. Therefore, testing of the instantly described process for making an alcohol-containing frozen comestible shows that the rate at which the alcohol-containing liquid composition is frozen into the solid alcohol-containing composition affects the degree of creaminess and final texture of the final product where the faster the rate of freezing and the lower the temperature of the initial freezing leads to a creamier and improved final texture over that of conventional ice cream freezing techniques.

Furthermore, in the process of making the alcohol-containing frozen comestibles of the instant disclosure the alcohol-containing liquid composition is rapidly frozen solid at a rate such that ice crystals and ice crystal agglomerates do not form. The resultant frozen solid alcohol-containing composition is then warmed or, in other words, tempered to a consistency or softness of conventional ice cream. In contrast, in the production a conventional non-alcohol-containing ice cream, the liquid composition is frozen to a still flowable state or soft ice cream consistency and then further frozen to a harder consistency.

Example 5

In another exemplary embodiment, Scotch whiskey was diluted from a 40% alcohol content per volume to about 17% per volume using cream to form the liquid alcohol composition. The resultant Scotch whiskey liquid composition was introduced to a liquid nitrogen bath and flash frozen to a solid Scotch whiskey composition so as to produce frozen, solid Scotch whiskey pieces. The solid Scotch whiskey pieces were then packaged in 500 ml cylindrical vessels and subjected to an environment having a temperature of about −25° C. for a time period of about 12 hours until the solid Scotch whiskey pieces had substantially melded into a single mass of the frozen Scotch whiskey composition. The frozen Scotch whiskey composition, being melded into a single mass, was then subjected to an environment having a temperature of about −100° C. for hardening and then, once hardened, stored at a temperature of about −35° C.

Example 6

In another example, 500 ml of Scotch whiskey diluted from an alcohol content of 40% per volume to about 17% per volume with cream was placed info a 1 L vessel (first vessel). The first vessel was then placed in an enclosed space (second vessel) with liquid nitrogen. The liquid nitrogen was not in direct contact with first vessel. As the liquid nitrogen converted to a gas, the cold nitrogen gas or vapours cooled the enclosed space to a temperature of about −60° C. as measured by an infrared thermometer. The temperature of the Scotch Whiskey and cream composition was allowed to equilibrate to the −60° C. temperature of the enclosed space and thus freeze to a solid alcohol-containing composition. Once frozen, the solid alcohol-containing Scotch whiskey and cream composition was stored overnight at about −30° C. to a softened single mass relative the solid alcohol-containing Scotch whiskey and cream composition as described above. The resultant product showed similar consistency characteristics to that of the embodiment of Example 5, that being substantially devoid of ice crystals and ice crystal agglomerates, yet having a creamy consistency similar to that of conventional non-alcoholic ice cream.

Although this disclosure has described and illustrates certain exemplary embodiments of the invention, it is to be understood that the invention is not restricted to those particular embodiments. Rather, the invention includes all embodiments which are functional or physical equivalents of the specific embodiments and features that have been described and illustrated.

Those of skill in the art will recognize certain modifications, permutations, additions and sub-combinations of the materials, components, process and steps noted herein. While a process and composition for producing an alcohol-containing frozen comestible is provided for what are presently considered preferred and exemplary embodiments, the invention is not so limited. To the contrary, the invention is intended to cover various modifications and equivalent materials included within the spirit and scope of the appended claims. The scope of the following claims is to be accorded the broadest interpretation so as to encompass all such modifications and equivalent materials and functions thereof.

What is claimed is:

1. A process for producing an alcohol-containing frozen comestible having a substantially uniform frozen consistency from a multi-component, alcohol-containing liquid composition, said process comprising the steps of:
   a) freezing said alcohol-containing liquid composition at a rate to effect substantially simultaneous freezing of said components in a freezing environment at a freezing temperature of about −30° C. or lower to produce a substantially single-phase solid alcohol-containing composition consisting of one or more solid alcohol-containing composition pieces;
   b) tempering said one or more solid alcohol-containing composition pieces at a tempering temperature that is greater than said freezing temperature of the freezing environment of step a) and that is within a range of from about −28° C. to about −25° C. and for a tempering time period of up to 12 hrs., so that a single mass having a desired level of creaminess is formed from said one or more solid alcohol-containing composition pieces; and
   c) cooling said single mass formed in step b) to a temperature of about −35° C. or lower to form said alcohol-containing frozen comestible;
   wherein said frozen comestible has said creaminess and is in a single phase.

2. The process as defined in claim 1, wherein said freezing to attain said substantially single-phase solid alcohol-containing composition of step a) is provided at a temperature of about −40° C. or less.

3. The process as defined in claim 1, wherein said freezing environment in which said substantially single-phase solid alcohol-containing composition is obtained from said alcohol-containing liquid composition in step a) is provided by solid $CO_2$ or liquid nitrogen; said alcohol-containing liquid composition is contained in a first vessel; said first vessel is co-placed in a second vessel larger than the first vessel together with said solid $CO_2$ or said liquid nitrogen; and said alcohol-containing liquid composition is then allowed to solidify in said first vessel arranged in said second vessel.

4. The process as defined in claim 1, wherein step a) includes adding said alcohol-containing liquid composition to said freezing environment in a shower-type or drop-wise fashion, so as to obtain a plurality of said solid alcohol-containing composition pieces.

5. The process as defined in claim 1, wherein said freezing of said alcohol-containing liquid composition of step a) includes contacting said alcohol-containing liquid composition with a suitably cold contact medium so as to solidify and attain said substantially single-phase solid alcohol-containing composition.

6. The process as defined in claim 5, wherein said cold contact medium is dry ice or liquid nitrogen.

7. The process as defined in claim 1, wherein step a) further includes fracturing said substantially single-phase solid alcohol-containing composition to obtain a plurality of said solid alcohol-containing composition pieces, each of which have a size in a range of from about a dust-like particle size to about 15 cm in cross-sectional length.

8. The process as defined in claim 1, wherein said temperature in said tempering of step b) is about −25° C.

9. The process as defined in claim 1, wherein said temperature for said cooling of said single mass in step c) is about −60° C.

10. The process as defined in claim 1, further including an additional step d), and wherein said additional step d) is encapsulating said single mass after performing step c) in an ice cream, a frozen dairy product, a frozen yogurt, a sorbet, or another enrobing composition suitable for a comestible product.

11. The process as defined in claim 1, wherein said alcohol-containing liquid composition includes from about 16% to about 24% of a sugar component, from about 12% to about 20% of a fat component and from about 15% to about 22% of an alcohol component.

12. A process for producing an alcohol-containing frozen comestible having a substantially uniform frozen consistency from a multi-component, alcohol-containing liquid composition, said process comprising the steps of:
a) freezing said alcohol-containing liquid composition at a rate to effect substantially simultaneous freezing of said components in a freezing environment at a freezing temperature of about −40° C. or lower to produce a substantially single-phase solid alcohol-containing composition consisting of one or more solid alcohol-containing composition pieces;
b) tempering said one or more solid alcohol-containing composition pieces at a tempering temperature that is greater than said freezing temperature in the freezing environment of step a) and that is within a range of from about −30° C. to about −15° C. and for a tempering time period of up to about 12 hours, so that a single mass having a desired level of creaminess is formed from said one or more solid alcohol-containing composition pieces; and
c) cooling said single mass to a temperature of about −35° C. or lower to form said alcohol-containing frozen comestible;
wherein said frozen comestible has said creaminess and is in a single phase.

13. The process as defined in claim 12, wherein said freezing to attain said substantially single-phase solid alcohol-containing composition of step a) is provided at temperature of about −60° C. or lower.

14. The process as defined in claim 12, wherein said freezing to solidify and attain said substantially single-phase solid alcohol-containing composition consisting of said one or more solid alcohol-containing composition pieces is provided by solid $CO_2$ or liquid nitrogen, said alcohol-containing liquid composition is contained in a first vessel, said first vessel is co-placed in a second vessel larger than the first vessel together with said solid $CO_2$ or said liquid nitrogen, and said alcohol-containing liquid composition is then allowed to solidify in said first vessel arranged in said second vessel.

15. The process as defined in claim 12, wherein step a) includes adding said alcohol-containing liquid composition to said freezing environment in a shower-type or drop-wise fashion, so as to obtain a plurality of said solid alcohol-containing composition pieces.

16. The process as defined in claim 12, wherein said freezing of said alcohol-containing liquid composition of step a) includes contacting said alcohol-containing liquid composition with a suitably cold contact medium so as to solidify and obtain said substantially single-phase solid alcohol-containing composition.

17. The process as defined in claim 16, wherein said cold contact medium is dry ice or liquid nitrogen.

18. The process as defined in claim 12, wherein step a) further comprises fracturing said substantially single-phase solid alcohol-containing composition to obtain a plurality of said solid alcohol-containing composition pieces, each of which have a size in a range of from about a dust-like particle size to about 15 cm in cross-sectional length.

19. The process as defined in claim 12, wherein said temperature in said tempering of step b) is about −25° C.

20. The process as defined in claim 12, wherein said tempering of step b) further includes maintaining said solid alcohol-containing composition in said temperature range for about 12 hours.

21. The process as defined in claim 12, wherein said temperature of said cooling of said single mass in step c) is about −60° C.

22. The process as defined in claim 12, further comprising an additional step d), and wherein said additional step d) is encapsulating said single mass after performing step c) in an ice cream, a frozen dairy product, a frozen yogurt, a sorbet, or another enrobing composition that would result in a comestible product.

23. The process as defined in claim 12, wherein said alcohol-containing liquid composition includes from about 16% to about 24% of a sugar component, from about 12% to about 20% of a fat component and from about 15% to about 22% of an alcohol component.

24. A process for producing an alcohol-containing frozen comestible having a substantially uniform frozen consistency from a multi-component, alcohol-containing liquid composition, said process comprising the steps of:
a) freezing said alcohol-containing liquid composition at a rate to effect substantially simultaneous freezing of said components in a freezing environment at a freezing temperature of about −30° C. or lower to produce a substantially single-phase solid alcohol-containing composition consisting of one or more solid alcohol-containing composition pieces;

b) tempering said one or more solid alcohol-containing composition pieces at a tempering temperature that is greater than said freezing temperature of step a) and that is within a range of from about −28° C. to about −25° C. and for a tempering time period of up to 12 hrs., so that at least one alcoholic mass having a desired level of creaminess is formed from the one or more solid alcohol-containing composition pieces by the tempering; and c) cooling said at least one alcoholic mass formed in step b) to a temperature of about −35° C. or lower to form said alcohol-containing frozen comestible;

wherein said frozen comestible has said creaminess and is in a single phase.

25. The process as defined in claim 24, wherein said freezing to attain said substantially single-phase solid alcohol-containing composition of step a) is provided at a temperature of about −40° C. or less.

26. The process as defined in claim 24, wherein said freezing environment in which said substantially single-phase solid alcohol-containing composition is obtained from said alcohol-containing liquid composition in step a) is provided by solid $CO_2$ or liquid nitrogen; said alcohol-containing liquid composition is contained in a first vessel; said first vessel is co-placed in a second vessel larger than the first vessel together with said solid $CO_2$ or said liquid nitrogen; and said alcohol-containing liquid composition is then allowed to solidify in said first vessel arranged in said second vessel.

27. The process as defined in claim 24, wherein step a) includes adding said alcohol-containing liquid composition to said freezing environment in a shower-type or drop-wise fashion, so as to obtain a plurality of solid alcohol-containing composition pieces.

28. The process as defined in claim 24, further including an additional step d), and wherein said additional step d) is encapsulating or enrobing said at least one alcoholic mass after performing step c) in an ice cream, a frozen dairy product, a frozen yogurt, a sorbet, or another comestible.

29. The process as defined in claim 24, wherein said alcohol-containing liquid composition includes from about 16% to about 24% of a sugar component, from about 12% to about 20% of a fat component and from about 15% to about 22% of an alcohol component.

30. A process for producing an alcohol-containing frozen comestible having a substantially uniform frozen consistency from a multi-component, alcohol-containing liquid composition, said process comprising the steps of:

a) freezing said alcohol-containing liquid composition at a rate to effect substantially simultaneous freezing of said components in a freezing environment at a freezing temperature of about −40° C. or lower to produce a substantially single-phase solid alcohol-containing composition consisting of one or more solid alcohol-containing composition pieces;

b) tempering said one or more solid alcohol-containing composition pieces at a tempering temperature that is greater than said freezing temperature of step a) and that is within a range of from about −30° C. to about −15° C. and for a tempering time period of up to 12 hrs., so that at least one alcoholic mass having a desired level of creaminess is formed from the one or more solid alcohol-containing composition pieces by the tempering; and c) cooling said at least one alcoholic mass formed in step b) to a temperature of about −35° C. or lower to form said alcohol-containing frozen comestible;

wherein said frozen comestible has said creaminess and is in a single phase.

31. The process as defined in claim 30, wherein said freezing to attain said substantially single-phase solid alcohol-containing composition of step a) is provided at a temperature of about −50° C. or less.

32. The process as defined in claim 30, wherein said freezing environment in which said substantially single-phase solid alcohol-containing composition is obtained from said alcohol-containing liquid composition in step a) is provided by solid $CO_2$ or liquid nitrogen; said alcohol-containing liquid composition is contained in a first vessel; said first vessel is co-placed in a second vessel larger than the first vessel together with said solid $CO_2$ or said liquid nitrogen; and said alcohol-containing liquid composition is then allowed to solidify in said first vessel arranged in said second vessel.

33. The process as defined in claim 30, wherein step a) includes adding said alcohol-containing liquid composition to said freezing environment in a shower-type or drop-wise fashion, so as to obtain a plurality of solid alcohol-containing composition pieces.

34. The process as defined in claim 30, further including an additional step d), and wherein said additional step d) is encapsulating said at least one alcoholic mass after performing step c) in an ice cream, a frozen dairy product, a frozen yogurt, a sorbet, or another comestible.

35. The process as defined in claim 30, wherein said alcohol-containing liquid composition includes from about 16% to about 24% of a sugar component, from about 12% to about 20% of a fat component and from about 15% to about 22% of an alcohol component.

36. A process for producing an alcohol-containing frozen comestible having a substantially uniform frozen consistency from a frozen non-alcohol-containing composition and a multi-component, alcohol-containing liquid composition, said process comprising the steps of:

a) freezing said alcohol-containing liquid composition at a rate to effect substantially simultaneous freezing of said components in a freezing environment at a freezing temperature of about −28° C. or lower to produce a substantially single-phase solid alcohol-containing composition consisting of one or more solid alcohol-containing composition pieces;

b) tempering said alcohol-containing composition pieces by mixing said one or more solid alcohol-containing composition pieces having an initial temperature of about −28° C. or lower with a non-alcohol-containing composition having a tempering temperature from about −8° C. to about −15° C. for a tempering time period of up to 12 hours, so as to temper and to at least partially meld said one or more solid alcohol-containing composition pieces with each other in order to obtain at least one individual alcoholic mass therefrom and a mixture of said at least one individual alcoholic mass and said non-alcohol-containing composition, so that said at least one individual alcoholic mass has a creamy texture; and c) cooling said mixture formed in step b) to a temperature of about −20° C. or lower so as to harden the mixture and obtain said alcohol-containing frozen comestible substantially devoid of ice crystal agglomerations, ice crystal striations or ice crystal pockets and with said uniform frozen consistency.

37. The process as defined in claim 36, including fracturing said single-phase solid alcohol-containing composition prior to introduction to said frozen non-alcohol-containing composition, said fracturing providing a plurality of said solid alcohol-containing composition pieces formable into said at least one individual-alcoholic mass, said plurality of solid alcohol-containing composition pieces each having a size of from about a dust-like particle size to about 15 cm in cross-sectional length.

38. The process as defined in claim 36, wherein said solid alcohol-containing composition pieces each have a size of from about 50 mm to about 150 mm in said cross-sectional length.

39. The process as defined in claim 36, including mixing said single-phase solid alcohol-containing composition and said non-alcohol-containing composition so as to produce striations and/or pockets of said solid alcohol-containing composition intermixed in said non-alcohol-containing composition.

40. The process as defined in claim 36, wherein said alcohol-containing liquid composition comprises from about 16% to about 24% of a sugar component, from about 12% to about 20% of a fat component, from about 15% to about 22% of an alcohol component, and a remainder, said remainder being comprised of water, optionally additional flavoring agents and optionally preservation agents.

41. The process as defined in claim 36, wherein said alcohol-containing liquid composition comprises a Scotch Whiskey, an Irish Whiskey, a mixture of an Irish Whiskey and a cream, or a Liqueur.

42. The process as defined in claim 36, wherein said frozen non-alcohol-containing composition is an ice cream, a frozen dairy product, a yogurt, or a sorbet.

43. The process as defined in claim 36, wherein an alcohol content of the alcohol-containing frozen comestible may be adjusted to that of a standard alcohol serving by varying an amount of said at least one individual alcoholic mass in said mixture of said at least one individual alcoholic mass and said non-alcohol-containing composition.

44. A process for producing an alcohol-containing frozen comestible having a substantially uniform frozen consistency from a frozen non-alcohol-containing composition and a multi-component, alcohol-containing liquid composition, said process comprising the steps of:
   a) freezing said alcohol-containing liquid composition at a rate to effect substantially simultaneous freezing of said components in a freezing environment at a freezing temperature of about −50° C. or lower to produce a substantially single-phase solid alcohol-containing composition consisting of one or more solid alcohol-containing composition pieces;
   b) tempering said alcohol-containing composition pieces by mixing said one or more solid alcohol-containing composition pieces having an initial temperature of about −50° C. or lower with a non-alcohol-containing composition having a tempering temperature from about −8° C. to about −15° C. for a tempering time period of up to 12 hours, so as to temper said one or more solid alcohol-containing composition pieces, in order to obtain at least one individual alcoholic mass therefrom and a mixture of said at least one individual alcoholic mass and said non-alcohol-containing composition, so that said at least one individual alcoholic mass has a creamy texture; and
   c) cooling said mixture formed in step b) to a temperature of about −25° C. or lower so as to harden the mixture and obtain said alcohol-containing frozen comestible substantially devoid of ice crystal agglomerations, ice crystal striations or ice crystal pockets and with said uniform consistency.

45. The process as defined in claim 44, said alcohol-containing liquid composition comprising from about 16% to about 24% of a sugar component, from about 12% to about 20% of a fat component, from about 15% to about 22% of an alcohol component, and a remainder, said remainder being comprised of water, optionally additional flavoring agents and optionally preservation agents.

46. The process as defined in claim 44, wherein said alcohol-containing liquid composition comprises a Scotch Whiskey, an Irish Whiskey, a mixture of an Irish Whiskey and a cream, or a Liqueur.

47. The process as defined in claim 44, wherein said frozen non-alcohol-containing composition is an ice cream, a frozen dairy product, a yogurt, or a sorbet.

48. The process as defined in claim 44, including fracturing said single-phase solid alcohol-containing composition prior to introduction to said non-alcohol-containing composition, said fracturing providing a plurality of said solid alcohol-containing composition pieces formable into said at least one alcoholic mass, said plurality of solid alcohol-containing composition pieces each having a size of from about 5 cm to about 15 cm in cross-sectional length.

49. The process as defined in claim 44, wherein said solid alcohol-containing composition pieces each have a size of from about 50 mm to about 150 mm in said cross-sectional length.

50. The process as defined in claim 44, including mixing said solid alcohol-containing composition and said non-alcohol-containing composition so as to produce striations and/or pockets of said alcohol-containing composition intermixed in said frozen non-alcohol-containing composition.

51. The process as defined in claim 44, wherein an alcohol content of the alcohol-containing frozen comestible may be adjusted to that of a standard alcohol serving by varying an amount of said at least one individual alcoholic mass in said mixture of said at least one individual alcoholic mass and said non-alcohol-containing composition.

* * * * *